US011025660B2

(12) United States Patent
Nilangekar et al.

(10) Patent No.: US 11,025,660 B2
(45) Date of Patent: Jun. 1, 2021

(54) IMPACT-DETECTION OF VULNERABILITIES

(71) Applicant: ThreatWatch Inc., Mountain View, CA (US)

(72) Inventors: Ketan Sateesh Nilangekar, Los Gatos, CA (US); Amol Narayan Godbole, Fremont, CA (US); Adrian Asher, Jersey City, NJ (US)

(73) Assignee: ThreatWatch Inc., Mountain View, CA (US)

( * ) Notice: Subject to any disclaimer, the term of this patent is extended or adjusted under 35 U.S.C. 154(b) by 221 days.

(21) Appl. No.: 16/208,341

(22) Filed: Dec. 3, 2018

(65) Prior Publication Data

US 2020/0177613 A1     Jun. 4, 2020

(51) Int. Cl.
*H04L 29/06*     (2006.01)
*G06F 21/57*     (2013.01)

(52) U.S. Cl.
CPC ........ *H04L 63/1433* (2013.01); *G06F 21/577* (2013.01); *H04L 63/145* (2013.01)

(58) Field of Classification Search
CPC .. G06F 21/577; H04L 63/1433; H04L 63/145
See application file for complete search history.

(56) References Cited

U.S. PATENT DOCUMENTS

| | | | |
|---|---|---|---|
| 10,819,732 B1* | 10/2020 | Buggar | H04L 63/1433 |
| 2012/0185945 A1* | 7/2012 | Andres | G06F 21/56 |
| | | | 726/25 |
| 2012/0304300 A1* | 11/2012 | LaBumbard | G06F 21/577 |
| | | | 726/25 |
| 2013/0055398 A1* | 2/2013 | Li | G06F 21/577 |
| | | | 726/25 |
| 2014/0137257 A1* | 5/2014 | Martinez | H04L 63/1433 |
| | | | 726/25 |
| 2015/0326601 A1* | 11/2015 | Grondin | G06F 21/6245 |
| | | | 726/25 |
| 2017/0116421 A1* | 4/2017 | M C | G06F 16/23 |
| 2019/0166151 A1* | 5/2019 | Bulut | G06Q 50/01 |
| 2020/0117808 A1* | 4/2020 | Neystadt | G06F 21/562 |

* cited by examiner

*Primary Examiner* — Thaddeus J Plecha
(74) *Attorney, Agent, or Firm* — Fernando & Partners, LLP

(57) ABSTRACT

Various implementations disclosed herein provide a method for detecting impact of the vulnerability by using a normalizer and correlator. In various implementations, the method includes: accessing a first set of data from a first data sources, calculating a risk level value for each of the first set of data based on a first set of rules, sorting the first set of data based on their risk level, accessing the sorted first set of data by a correlator, accessing, by the correlator, a second set of data from second data sources, correlating each of the sorted first set of data to at least a data of the second set of data based a second set of rules, and calculating a confidence score for each data of the sorted first set of data based on a third set of rules.

12 Claims, 5 Drawing Sheets

IMPACT-DETECTION OF VULNERABILITIES

TECHNICAL FIELD

The present disclosure generally relates to vulnerability-impact detection, and in particular, to vulnerability-impact detection by using a correlator and a normalizer.

BACKGROUND

Vulnerabilities impacting software, hardware, and/or firmware (e.g., in general IT resources) are continuously being discovered. For an enterprise (or any organization)-regardless of whether a vulnerability impacts software, hardware or a system configuration-determining the relevance of the vulnerability as it relates to the IT resources of the enterprise is valuable for effective mitigation. There is an urgent need for an integrated platform that covers a broad spectrum from vulnerabilities in micro-processors, kernel and operating systems to content management systems, ERP solutions, dev ops tools, networking gear, pen source software and much more. Timing is also valuable for proactive security measures, as vulnerabilities are constantly getting uncovered and its hours and minutes that matter when it comes to building a strategy to deal with them on a daily basis. However, a significant number of reports of vulnerability are unreliable, and each report should be assessed to evaluate its reliability. On the other hand, there is a need for a real-time correlation between the reliable vulnerability reports and the affected assets to ensure appropriate actions (such as ticketing and patches) as quick as possible.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
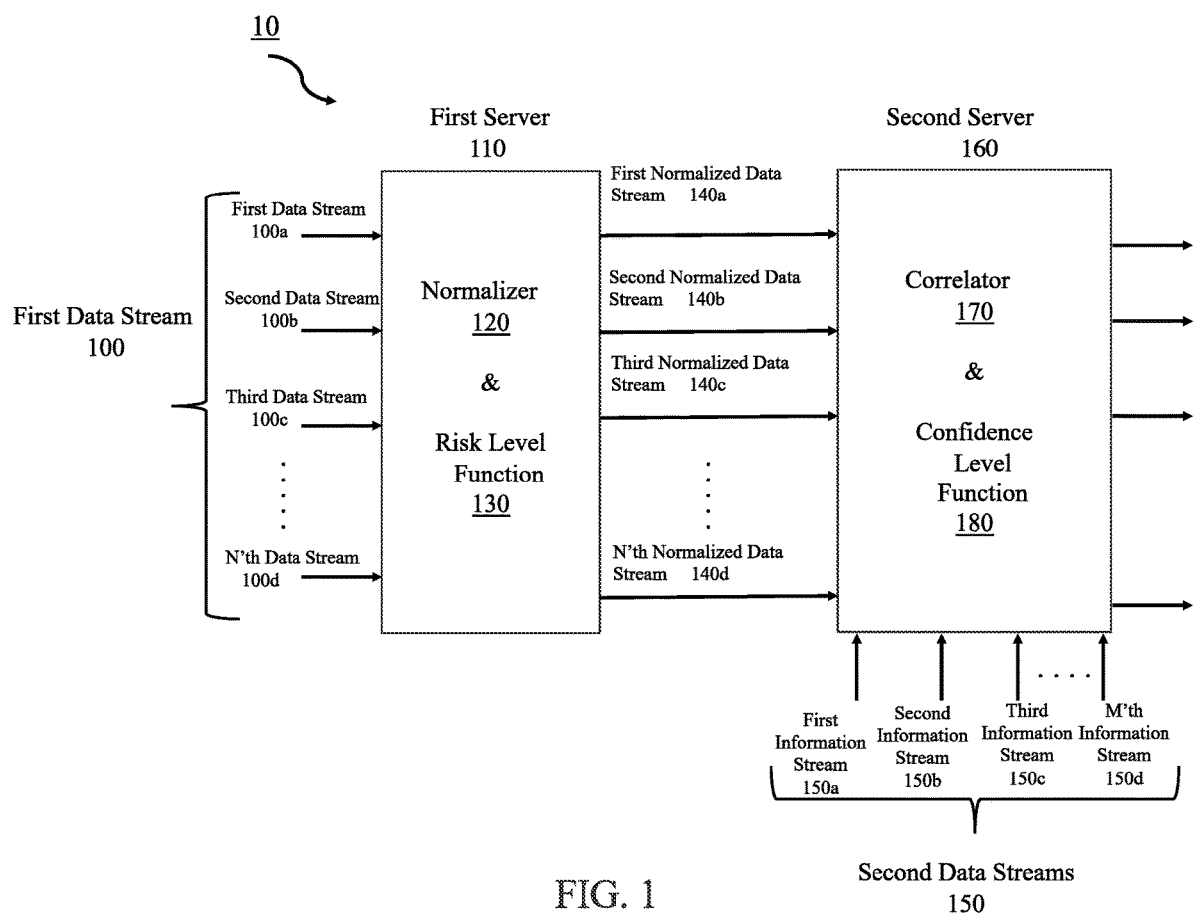
FIG. 1 is a block diagram of a system configured to detect impact of vulnerability by a normalizer and correlator in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable detecting impact of a vulnerability by using a correlator and a normalizer. Disclosed system for impact-detection of vulnerability includes a normalizer to access a first set of data (e.g., vulnerability reports) that are provided by one or more first data sources (e.g., from one or more crawlers). The normalizer further uses a risk level function associated with each of the data sources to calculate a risk level value for each of the first set of data based on a first set of rules (e.g., a severity of risk). Each risk level value is calculated based on one or more criteria, where the risk level value is a number between 1 and 5. The normalizer then sort the first set of data based on their respective risk level value. The normalizer output then is accessed by a correlator. The correlator further accesses a second set of data (e.g., information about a hardware or a software) that are provided by one or more second data sources (e.g., an inventory database). The correlator then correlates each of the sorted first set of data to at least a data of the second set of data based on one or more of a second set of rules. The correlator further calculates a confidence score for each data of the sorted first set of data based on one or more rule of a third set of rules.

Example Embodiments

Software, hardware and firmware can have vulnerabilities. Left unaddressed, those vulnerabilities expose to risk the systems and products on which they are deployed and the people who depend on them. In order for vulnerable systems to be fixed, those vulnerabilities must first be found. Once found, the vulnerability impact should be assessed, as many of the vulnerabilities are not serious. Afterwards, the vulnerable code must be patched, the hardware must be recalled and fixed, or configurations must be modified. Patches must be distributed and deployed. In the traditional computing arena, most vendors and researchers have settled into a reasonable rhythm of allowing the vendor some time to fix vulnerabilities prior to publishing a vulnerability report more widely. Software as a service (SaaS) and software distributed through app stores can often fix and deploy patches to most customers quickly. On the opposite end of the spectrum, many Internet of Things (IoT) and embedded device vendors can be found for whom fixing a vulnerability might require a firmware upgrade or even physical replacement of affected devices, neither of which can be expected to happen quickly (if at all). This diversity of requirements forces vendors and researchers alike to reconsider their expectations with respect to the timing and level of detail provided in vulnerability reports. Coupled with the proliferation of vendors who are relative novices at internet-enabled devices and are just becoming exposed to the world of vulnerability research and disclosure, the shift toward IoT can be expected to reinvigorate numerous disclosure debates as the various stakeholders work out their newfound positions. A process must be defined intended to ensure that these steps occur in a way that minimizes the harm to society posed by vulnerable products.

In modern Internet, manually reviewing each networked system for security flaws is no longer feasible. Operating systems, applications, and network protocols have grown so complex over the last decade that it takes a dedicated security administrator to keep even a small network shielded from attack. Each technical advance brings wave after wave of security holes. A new protocol might result in dozens of actual implementations, each of which could contain exploitable programming errors. Logic errors, vendor-installed back-doors, and default configurations plague everything from modern operating systems to the simplest print server. Yesterday's viruses seem positively tame compared to the highly optimized Internet worms that continuously assault every system attached to the global Internet. To combat these attacks, a network administrator needs the appropriate tools and knowledge to identify vulnerable systems and resolve their security problems before they can be exploited. One of the most important steps is the vulnerability-impact assessment.

The vulnerability reports may disclose a vulnerability in a software or a hardware of a system configuration of a product. A vulnerability may be a set of conditions or behaviors that allows the violation of an explicit or implicit security policy. Moreover, vulnerabilities can be caused by software defects, hardware defects or malfunctions, configuration or design decisions, unexpected interactions between systems, or environmental changes. Vulnerabilities may arise in information processing systems as early as the design phase and as late as system deployment. A weakness in an information system, system security procedures, internal controls, or implementation that could be exploited or triggered by a threat source is a vulnerability as well. Vulnerabilities are no longer just the realm of system crackers and security consultants; they have become the enabling factor behind most network worms, spyware applications, and e-mail viruses. Spammers are increasingly relying on software vulnerabilities to hide their tracks. Vulnerabilities can be found by every user. All it takes is for someone to notice an unexpected or surprising behavior of a system. Although it is common for independent security researchers to hunt vulnerabilities as either a hobby or profession, finders need not self-identify as security researchers or hackers. The reporters may be students and professional academics studying novel ways to exploit systems or protocols or open source developers who notice that a software bug has security implications. System administrators who recognize a vulnerability during the course of troubleshooting a system error, or professional security analysts who observe a previously unknown product vulnerability while testing an organization's infrastructure during a penetration test engagement, may be the reporter. Moreover, the reporters may be people using software or web services who mistyped some input or simply clicked on the wrong thing.

Vulnerability assessments have become a critical component of many organizations' security infrastructures; the ability to perform a networkwide security snapshot supports a number of security vulnerability and administrative processes. When a new vulnerability is discovered, the network administrator can perform an assessment, discover which systems are vulnerable, and start the patch installation process. After the fixes are in place, another assessment can be run to verify that the vulnerabilities were actually resolved. This cycle of assess, patch, and re-assess has become the standard method for many organizations to manage their security issues. Many organizations have integrated vulnerability assessments into their system rollout process. Before a new server is installed, it first must go through a vulnerability assessment and pass with flying colors. This process is especially important for organizations that use a standard build image for each system; all too often, a new server can be imaged, configured, and installed without the administrator remembering to install the latest system patches. Additionally, many vulnerabilities can only be resolved through manual configuration changes; even an automated patch installation might not be enough to secure a newly imaged system.

Since enumerating hosts and services is the first part of any vulnerability assessment, regular assessments can provide a current and very useful understanding of the services offered on the network. Assessments assist in crises: when a new worm is released, assessment reports are often used to generate task lists for the system administration staff, allowing them to prevent a worm outbreak before it reaches critical. To assess a vulnerability, the impact of that vulnerability should be evaluated first. This application provides a system and a method thereof to tackle a challenge in fixing vulnerabilities: to determine the impact of the vulnerability on the users' asset.

FIG. 1 is a block diagram of a system 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the system 10 includes one or more first data streams 100 (e.g., a first data stream 100*a*, a second data stream 100*b*, a third data stream 100*c*, an n'th data stream 100*d*), a first server 110, one or more second data streams 150. The second data stream may include a plurality of information streams (e.g., a first information stream 150*a*, a second information stream 150*b*, a third information stream 150*c*, an m'th information stream 150*d*). in some implementations, the first server 110 includes a normalizer 120 and a risk level function 130 associated with the normalizer 120. In some implementations, the second server 160 include a correlator 170 and a confidence level function 180 associate with the correlator 170. In some implementations, the first data streams 100 communicate with the first server 110 and the second data streams 150 communicate the second server 160 via a network (not shown). In various implementations, the network includes a public network (e.g., a portion of the Internet, a cellular network, etc.) and/or a private network (e.g., a virtual private network (VPN)).

In various implementations, the first data streams 100 include data that are received from web applications. For example, the first data streams 100 may include from Twitter accounts, Facebook accounts, RSS feeds, blogs, etc. In various implementations, the first data streams 100 may be output from one or more crawlers that crawl network sources in search for vulnerability reports. In some embodiments, the vulnerability report is found on a twitter account or a Facebook account, an RSS feed of a vendor or a manufacturer, a post on a weblog dedicated to vulnerability reports or any webpage or web application which reports vulnerability reports on a regular basis. In some implementations, each data stream (i.e., first data stream 100*a*, second data stream 100*b*, etc.) may include one or more vulnerability reports. In various implementations, vulnerability reports are reported by reporters/finder who is a researcher, a scholar, an expert in the art, or someone who either is informed directly, or indirectly from someone else about the vulnerability. In some embodiments, finder as an individual or organization that identifies a potential vulnerability in a product or online service. In some embodiments, finders can be researchers, security companies, users, governments, or coordinators. Although in some instances the finder may be different from the reporter, that is the user who reports the vulnerability may be different from the user who discovers the vulnerability, in the interest of consistency, terms finder and reporter are used interchangeably. The vulnerability reports may disclose a vulnerability in a software or a hardware of a system configuration of a product. In various implementations, a vulnerability is a set of conditions or behaviors that allows the violation of an explicit or implicit security policy. Vulnerabilities can be caused by software defects, hardware defects or malfunctions, configuration or design decisions, unexpected interactions between systems, or environmental changes. In various embodiments, vulnerabilities arise in information processing systems as early as the design phase and as late as system deployment. In various implementations, a vulnerability is a weakness in an information system, system security procedures, internal controls, or implementation that could be exploited or triggered by a threat source. In some embodiments, the vulnerability is a weakness in a system, application, or network that is subject to exploitation or misuse. In some other embodiments, the vulnerability is a weakness in an information system, system security procedures, internal controls, or implementation that could be exploited by a threat source.

Vulnerabilities can be found by every user. All it takes is for someone to notice an unexpected or surprising behavior of a system. Although it is common for independent security researchers to hunt vulnerabilities as either a hobby or profession, finders need not self-identify as security researchers or hackers. In some embodiments, the reporters are students and professional academics studying novel ways to exploit systems or protocols. In various implementations, the reporters are open source developers who notice that a software bug has security implications. In other embodiments, the reporters are system administrators who recognize a vulnerability during the course of troubleshooting a system error. In yet other embodiments, the reports are professional security analysts who observe a previously unknown product vulnerability while testing an organization's infrastructure during a penetration test engagement. In yet other embodiments, the reporters are people using software or web services who mistyped some input or simply clicked on the wrong thing. In some embodiments, vulnerabilities are reported by organizations that look for them. In some instances, some of these organizations work under contract to vendors directly. In some embodiments, reporters work for the vendors' customers who deploy the software. Furthermore, in some embodiments, vendors may choose to look for vulnerabilities in their own products. This can be done via (a) in-house expertise and testing, (b) contracted security testing, or (c) solicited on a per-vulnerability basis using a bug bounty program.

In some embodiments, the normalizer 120 may access each stream of the first data streams 100 and match each vulnerability report to a severity risk level. To that end, the normalizer 120 may use the risk level function 130 associated with the normalizer 120 to assign the severity risk level to each vulnerability report. The severity risk level is an integer between 1 and 5, 1 being defined as the lowest risk level and 5 being defined as the highest risk level. Each data stream (i.e., the first data stream 100a, the second data stream 100b, the third data stream 100c, the n'th data stream 100d) is being normalized and assigned a severity risk level and is outputted by the first server 110 as normalized data streams (i.e., first normalized data stream 140a, second normalized data stream 140b, third normalized data stream 140c, n'th normalized data stream 140d, etc.). In various implementations, the normalizer may sort the normalized data streams based on their respective severity risk levels.

In some embodiments, the correlator 170 may access normalized data streams (i.e., first normalized data stream 140a, second normalized data stream 140b, third normalized data stream 140c, n'th normalized data stream 140d, etc.). The correlator 170 may further access the second data streams 150 (i.e., first information stream 150a, second information stream 150b, third information stream 150c, m'th information stream 150d, etc.). In various implementations, the second data streams 150 include information about a hardware or a software or a system configuration obtained from different sources. For example, the second data streams 150 may be an inventory database, a Comma-Separated Values (CSV) upload, a Representational State Transfer (ReST) API, a Powershell or a Unix Scripts, etc. In various implementations, the second data streams may be provided by a user associated with the respective second information. As an example, the user may be a person associated with an entity (a company, a corporation, an office), who is responsible to provide a list of the software and hardware of the entity.

In various implementations, the correlator 170 may match each of the normalized data streams (i.e., first normalized data stream 140a, second normalized data stream 140b, third normalized data stream 140c, n'th normalized data stream 140d, etc.) with a correlated data found on each of the second information streams 150. To that end, the correlator 170 uses the second data streams 150 and finds the information streams that match each of the normalized data streams. For example, when the first normalized data stream includes report of a malware in a specific processor, the correlator 170 accesses the information streams that include the assets that use the specific processor. In various implementations, the correlator 170 by means of the confidence level function 180 associated with the correlator 170, calculates and assigns a confidence score to each of the normalized data streams.

Figure 2:
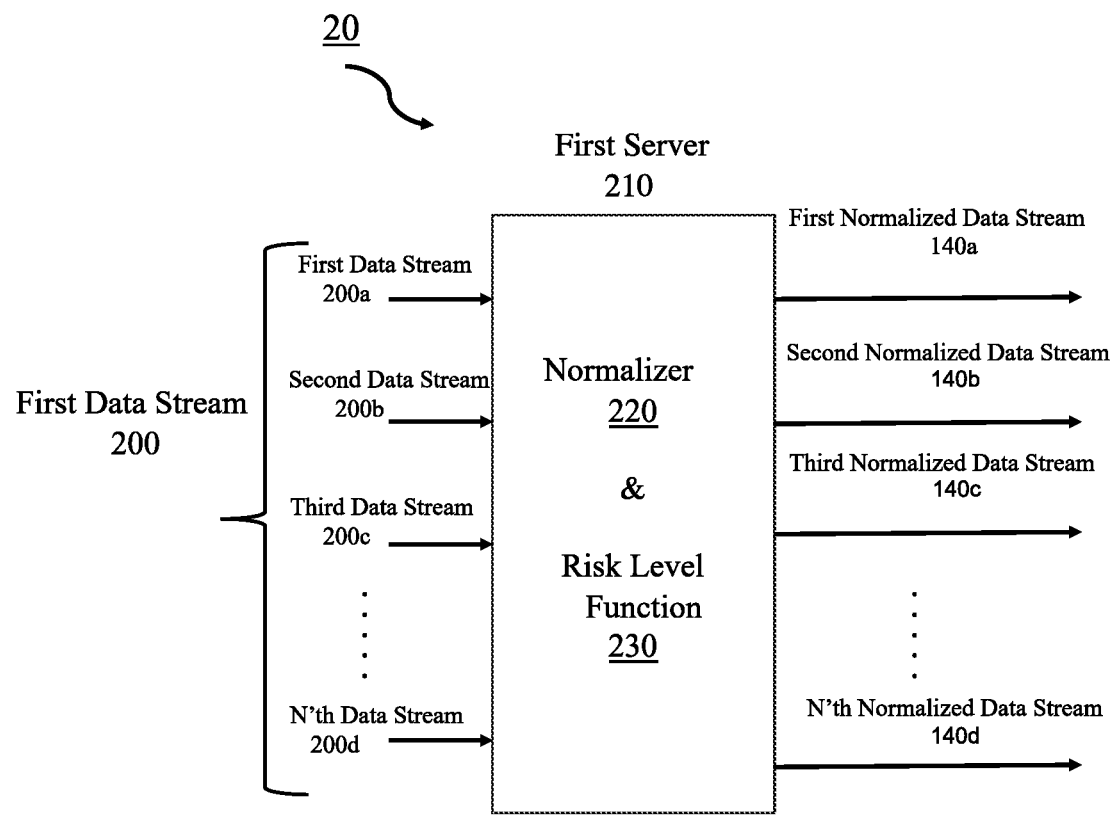
FIG. 2 is a block diagram of a normalizer in accordance with some implementations.

FIG. 2 is a block diagram of a system 20 in accordance with some implementations illustrating the first server 210 which includes the normalizer 220 and the risk level function 230 associated with the normalizer 220. In various implementations, the normalizer 220 discovers vulnerability reports for severity, risk, affected products, patch information and other attributes. In various implementations, the normalizer 220 receives the first data streams 210 and matches each data stream to a severity risk level. The severity risk level is an integer between 1 and 5, 1 being defined as the lowest risk level and 5 being defined as the highest risk level. In various implementations, the severity risk level function 230 may use a set of rules to calculate a severity risk level for each data stream. In certain implementations, the set of rules may include the severity of risk, the affected product, an available patch information, etc. In certain implementations, the severity risk level function uses a combination of the above-mentioned factors to calculate the severity risk level of a data stream. Using the severity risk level enables the server 210 to map (i.e., sort) the first data streams 200 (e.g., a first data stream 200a, a second data stream 200b, a third data stream 200c, . . . , and an n'th data stream 200d) to standardized risk level. In some embodiments, a vendor may use its own risk levels. In these instances, the normalizer uses a simple mapping between a vendor's risk levels and normalizer's severity risk levels. For example, when a vendor assigns 3 levels of risks; important, high, and critical, then the normalizer assigns 1 as important, 3 as high and 5 as critical to the data stream associated with the vendor. This can occur when the vendor is an especially structured vendor such as vendor advisory. In some embodiments, when the data stream is received from unstructured sources, such as blogs, a neural-net-based model is trained with textual descriptions of a large set of vulnerabilities tagged with their respective risk levels. Over time the model "learns" what makes a vulnerability severity risk level "1" versus what makes the vulnerability severity risk level "5". Thereafter, when the model is shown a random blog post, the model is able to assign a severity risk level to the post based on its learning. A validation method that runs offline makes sure the model is giving high levels of accuracy and keeps on updating the model.

More often than not, some of the data streams include different languages, syntax, and protocols. Therefore, in some embodiments, the normalizer 220 uses a canonical data model to present different data entities and relationships in the simplest possible form in order to integrate processing these data. The purpose of using the canonical form is to enable the normalizer 220 to create and distribute a common definition of its entire data unit. In some embodiments, after the normalizer 220 converts the data streams received from the first data sources 210 (i.e., the raw source materials) into a canonical form, the normalizer 220 strips unnecessary content and converts the data forms to standard unicode forms. This allows for smoother integration between the first server 210, the second server 160 and their associated components, which can improve processes, and further makes data mining easier. In some embodiments, the vulnerability reports do not conform to the canonical form. In these instances, the normalizer 220 rejects the vulnerabilities which do not conform to the canonical form.

In some embodiments, some data received from the first data streams 210 include large quantities of text. Some portions of the textual content may be irrelevant or unimportant to process. However, processing the entire textual content may require more space and be time-consuming. Therefore, in some embodiments, the normalizer 220 summarizes large quantities of text from the data received from the first data streams 200 into more manageable content. This is done using a Natural Language Program (NLP) technique (e.g., frequency summarizing). In some embodiments, the crawlers, which are specifically designed to detect vulnerability reports, cannot determine some information. In such circumstances, the normalizer 220 may fill the missing information that crawlers could not determine (e.g. published and last modified dates associated with the vulnerability reports). Not all the vulnerabilities are of the same type. For example, some vulnerabilities may be categorized into different categories depending on attack types. As an example, and not by way of limitations, the vulnerability may be a Man-in-the-middle, a denial-of-service, a privilege-escalation, etc.

In certain implementations, the normalizer 220 aggregates all pertinent information received from the first data streams 200. The normalizer 220 may use two methods in order to determine what information is pertinent and what information is not pertinent: (a) Static method: in this method, for certain data streams, which consistently report vulnerabilities for a particular platform, operating system, hardware, or component (e.g., Microsoft RSS feed reporting only Microsoft vulnerabilities), there is a mapping strategy that matches the source of the data stream and the type of the asset. In some embodiments, the type of the asset may be specified by the user. In some embodiments, the type of the asset may be derived from an asset database or may be inferred based upon the metadata of the asset. An asset could have multiple asset type. For example, as asset may have Intel, Linux, Database, Web Server and Nodejs types, with each type mapping to one or more source of the data stream. This mapping may further serve as a guide on how to apply a vulnerability to a certain data stream, (b) Dynamic method: in this method, for certain data streams, which are not consistent and may report vulnerabilities on different vendors, platforms, etc. (e.g., a blog or a twitter handle), a Named Entity Extractor (NER) is used. The NER relies on a fairly large set of vendor and/or product keywords to determine the context of the data stream (e.g., a data received from a blog post) to determine its mapping with a set of asset types. For example, a blog post reporting a certain operating system kernel vulnerability in the context of a certain processor may throw up keywords such as: name of the operating system, kernel, name of the certain processor, etc. as named entities, which are then used to establish the mapping with asset types. In some embodiments, the normalizer 220 add the data received from the first data stream only to the pertinent data streams and not to the irrelevant streams. For example, when normalizer detects a vulnerability in a specific operating system, it does not add the information to the data streams that include other operating systems.

The normalizer 220 looks for any type of exploits. An exploit is a piece of software, a chunk of data, or a sequence of commands that takes advantage of a vulnerability to cause unintended or unanticipated behavior to occur on computer software, hardware, or something electronic. In certain embodiments, the normalizer 220 looks for active vulnerabilities that work over a network and exploit the security vulnerability without any prior access to the vulnerable system (i.e., remote exploits). In some embodiments, the normalizer 220 looks for active exploits that require prior access to the vulnerable system and usually increase the privileges of the person running the exploit past those granted by the system administrator (i.e., local exploits). In some embodiments, the normalizer 220 looks for active exploits against client applications, which usually consist of modified servers that send an exploit if accessed with a client application.

In some embodiments, once a vulnerability is reported, there are some patches readily available to cure the vulnerability. A patch is a set of changes to a computer program or its supporting data designed to update, fix, or improve the software. A patch includes fixing security vulnerabilities and other bugs and improving the usability or performance. In some embodiments, once the normalizer 220 detects a vulnerability, the normalizer 220 further looks for any existing patch for the vulnerability among the data received form the first data streams 200.

Figure 3:
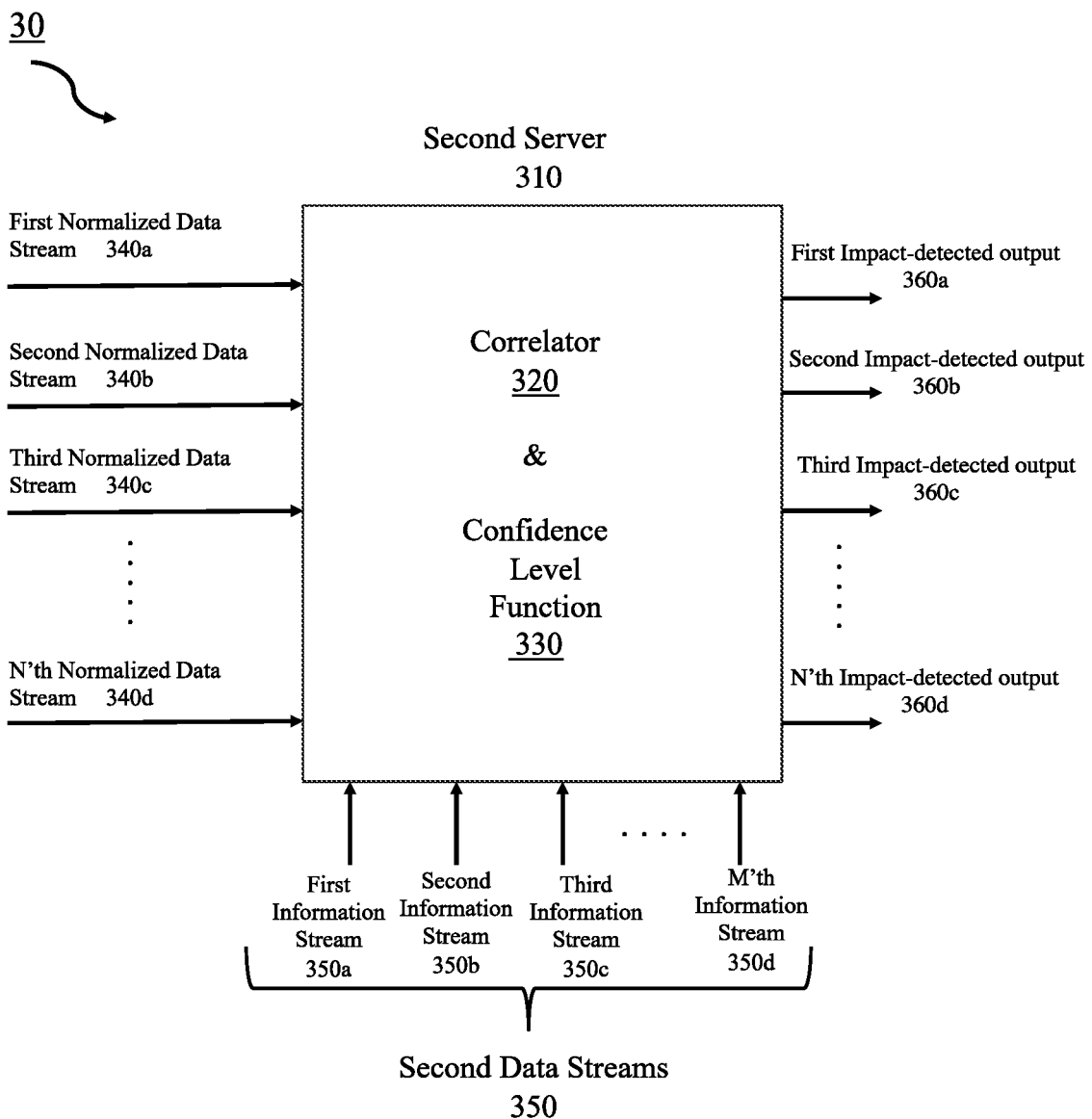
FIG. 3 is a block diagrams of a correlator in accordance with some implementations.

FIG. 3 is a block diagram of a system 30 in accordance with some implementations illustrating the second server 310 which includes the correlator 320 and the confidence level function 330 associated with the correlator 320. In some embodiments, the correlator 320 may access normalized data streams (i.e., first normalized data stream 340a, second normalized data stream 340b, third normalized data stream 340c, n'th normalized data stream 340d, etc.). The correlator 320 may further access the second data streams 350 (including first information stream 350a, second information stream 350b, third information stream 350c, m'th information stream 350d, etc.). In various implementations, the second data streams 350 include information about an asset (i.e., a hardware or a software or a system configuration) obtained from different sources. For example, the second data streams 350 may be an inventory database, a Comma-Separated Values (CSV) upload, a Representational State Transfer (ReST) API, a Powershell or a Unix Scripts, etc. In various implementations, the second data streams 350 include inventory of assets (i.e., asset profile) of an enterprise. In various implementations, the assets information may be provided by a user associated with the respective assets. As an example, the user may be a person associated with an entity (e.g., a company, a corporation, an office), who is responsible to provide a list of the software and hardware (i.e., asset profile) of the entity (e.g., an IT manager). In various implementations, the asset profile is being updated. In various implementations, the asset profile of an entity may be updated by the respective entity or by asset tracking or by any technical fingerprint method. For example, the IP manager associated with the entity may update the asset profile of the entity quarterly, annually, etc. The asset profile of an entity may include information about the entity's desktop computers, servers, laptops, mobile devices, software and operating systems they use, etc. For example, asset profile of an entity may include serial numbers, processor types, operating systems, etc. of the each of its assets types. In various implementations, the asset may include a combination of hardware and software and system configurations.

In various implementations, the correlator 320 may match each of the normalized data streams (i.e., first normalized data stream 340a, second normalized data stream 340b, third normalized data stream 340c, n'th normalized data stream 340d, etc.) with a correlated data found on the second information streams 350. For example, when the first normalized data stream includes report of a malware in a specific processor, the correlator 320 accesses the information streams that include the assets that use that specific processor. In various implementations, the correlator 320 by means of the confidence level function 330 associated with the correlator 320, calculates and assigns a confidence score to each of the normalized data streams. The confidence score is a measure of the level of impact of the vulnerability on the assets. The correlator's metrics to perform its tasks may include, but not limited to: vulnerability product list, asset metadata, source believability, exposure of the assets, etc.

In general, traditional software and hardware companies are vendors. However, any company or organization that provides a product that relies on a computer or software is referred to as a vendor, even if the company doesn't directly make the computer or software components used by its products. Moreover, a student who developed an application and placed it in a mobile app store for free download meets this definition of vendor, as does a large multinational company with thousands of developers across the globe. Further, an open source library which is maintained by a single person or a small independent team is referred to as an individual vendor.

In various implementations, a vendor is a company involved with consumer products, such as home automation and the internet of things (IoT). In some embodiments, a vendor is an internet service provider (ISP) and a maker of devices that access ISP services, such as internet modems, routers, access points. In some embodiments, a vendor is a mobile phone manufacturer and a service provider. In various implementations, a vendor is an industrial control system company, including building automation, an HVAC manufacturer, an infrastructure supplier and a smart utility service company including water and sewer services and the energy industry. In some embodiments, a vendor is a transportation service company, including the airline and automotive industries or a medical devices and health-related device manufacturer.

In various implementations, vulnerability product list includes a vendor's name, a product name, a product version, a product part number, or any combination thereof. In some situations, the detected vulnerability report does not contain the product name and version and its vendor. For example, a user reports a bug in a specific operating system by mentioning only the name of the operating system. In various implementations, the correlator uses an NER to extract the missing data regarding the asset. For example, the correlator detects a reported bug in "Snow Leopard". The NER, which is trained using a corpse of data to extract the vendor, product name and the version of the asset, matches the report to the operating system on Macintosh computers. In various implementations, the vulnerability product list is provided by the normalized first data streams from the normalizer, or any other source. In various implementations, the correlator, upon detecting a vulnerability in a broad class of assets, further parse the asset inventory to refine the search within the assets to find the exact assets classes that are affected.

In various implementations, the information about the asset (i.e., asset metadata) is provided by the second data streams 350. The asset metadata may include asset product list, platform or operating system that the assets are working on, or any other metadata about those assets. In various implementations, source believability may be determined based on historical data of the first data source and/or the frequency of the reported vulnerability. For example, when a data source has historically reported reliable vulnerability reports, the data source is more believable (i.e., more reliable) than a weblog, which the in the past, has reported a false vulnerability about a competitor's product to promote their product and harm a competitor. As another example, a vulnerability report that has reported by five different data sources is more believable compared to a vulnerability report that has reported only by one data source.

In various implementations, when the system for impact-detecting of vulnerability looks into where affected assets are located to assess the degree of exposure of the assets and to calculate the confidence score.

In various implementations, the confidence-level assigned data is outputted from the second server 310 as impact-detected output (first impact-detected output 360a, second impact-detected output 360b, third impact-detected output 360c, n'th impact-detected output 360d, etc.). The confidence level function 330 associated with the correlator 320 calculates and assigns a confidence score to each normalized data stream and for each respective asset. Therefore, when there is more than one vulnerability report for an asset, then the impact-detected output contains more than one confidence score. In certain implementations, when the calculated confidence score of an impact-detected output is above a predetermined threshold, the system for impact-detection of vulnerability notifies a user associated with the asset or provides the user with a patch or a ticketing tool.

In various implementations, the system for impact-detection of vulnerability performs in a continuous, near real-time fashion to monitor the reported vulnerabilities. This continuous monitoring makes the system for impact-detection of vulnerability adaptable, since the user does not need to wait for the vulnerability to be established. That is, the system for impact-detecting of vulnerability is faster than Common Vulnerabilities and Exposures (CVE), which only provides a reference-method for publicly known vulnerabilities.

The ever-increasing number of hardware and software makes it near impossible to process all the users' assets. Therefore, the system for impact-detecting of vulnerability uses some techniques to decrease the volume of data to be processed, without compromising the accuracy of the overall process. One of these techniques is abstraction of assets. In the abstraction of assets technique, in order to closely attend to the relevant information of the assets (i.e., name of the vendor, product name, product version, product part number), other details or attributes of assets or systems (physical, spatial or temporal) are removed.

Most of the entities, purchase their hardware and software from specific vendors. Therefore, different types of the entity's assets (e.g., desktop computers, mobile devices, etc.) share same specifications or common identifiers. For example, most of the desktops of an office are purchased from a same vendor, and have same processors, operating systems, etc. Hence, the system for impact-detection of vulnerability creates a symbolic asset for each class of assets to deduplicate the physical assets. For example, when there are thousand desktop computers with the same processors and operating systems, the system of the present application uses one of the desktop computers and creates a symbolic asset based on that desktop computer. This deduplication of physical assets expedites performance of the system for impact-detection of vulnerability. As another example, where there are a million IoT dwellers with identical stack, the system of the present application may use a representative dweller as the symbolic asset and maps it to actual devices.

Figure 4:
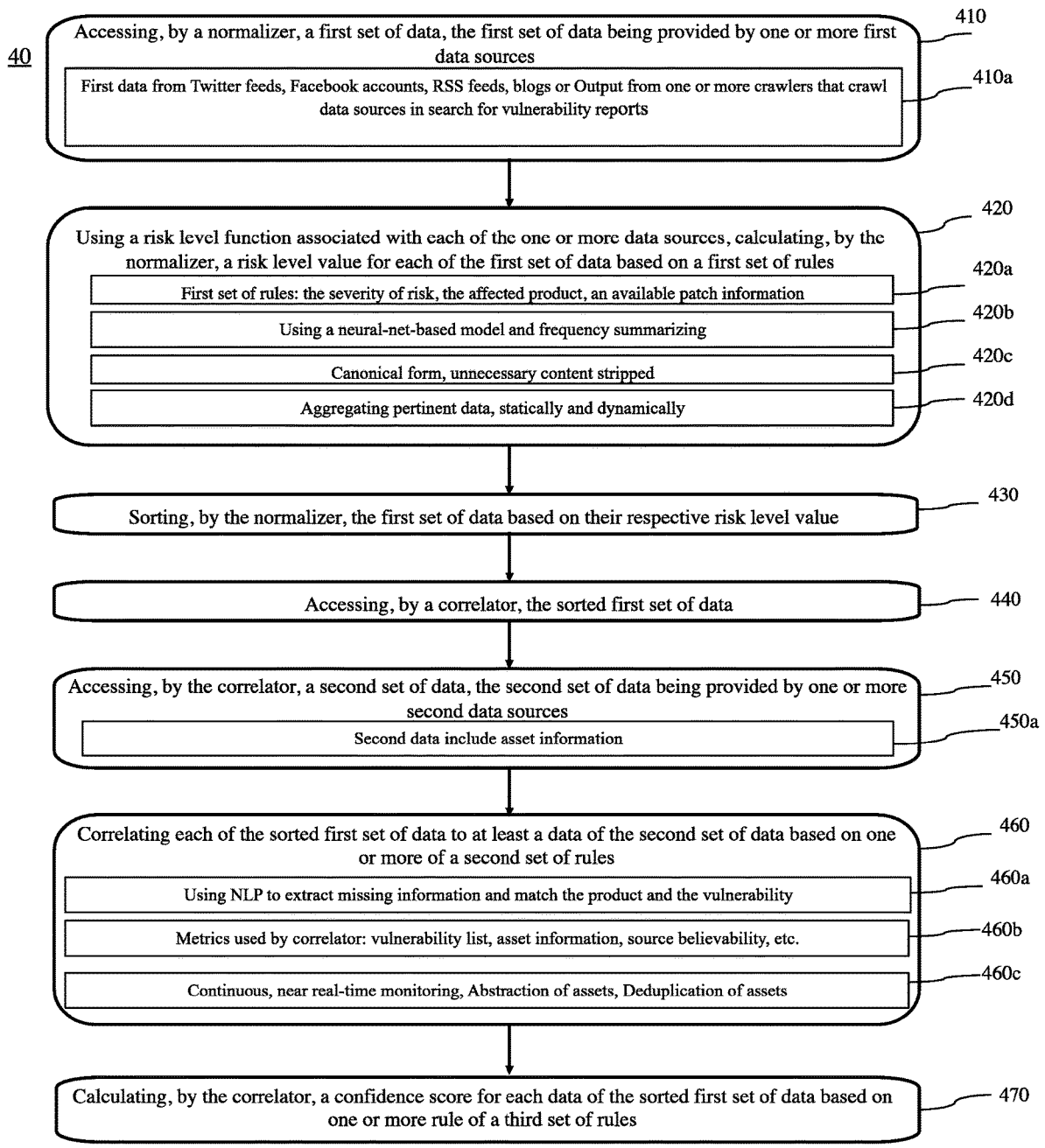
FIG. 4 is a flowchart representation of a method of detecting the impact of vulnerability by a normalizer and correlator in accordance with some implementations.

FIG. 4 is a flowchart representation of a method 40 of impact-detecting of vulnerability using a normalizer and correlator in accordance with some implementations. In various implementations, the method 40 is performed by a first server associated with a normalizer and a risk level function (e.g., the normalizer 120 and the risk level function 130 in FIG. 1) and a second server associated with a correlator and a confidence level function (e.g., the correlator 170 and the confidence level function 180 in FIG. 1). Briefly, the method 40 includes accessing, by a normalizer, a first set of data; calculating a risk level value for each of the first se; accessing, by a correlator, sorted first set of data and a second set of data, correlating each of the sorted first set of data to at least a data of the second set and calculating a confidence score for each data of the sorted first set of data.

To that end, as represented by block 410, in some implementations the method 40 includes accessing a first set of data from one or more first data sources (e.g., the first data streams 100 shown in FIG. 1). In some implementations, the one or more data sources includes Twitter feeds, Facebook accounts, RSS feeds, blogs, etc. In some implementations, the first data streams may be output from one or more crawlers that crawl network sources in search for vulnerability reports (shown in block 410a). In some embodiments, the vulnerability report is found on a twitter account or a Facebook account, an RSS feed of a vendor or a manufacturer, a post on a weblog dedicated to vulnerability reports or any webpage or web application which reports vulnerability reports on a regular basis. In some implementations, each data stream (i.e., first data stream 100a, second data stream 100b, etc. shown in FIG. 1) includes more than one vulnerability report.

In some embodiments, the normalizer may access each stream of the first data streams and match each vulnerability report to a severity risk level (as shown in block 420). The normalizer may use the risk level function to assign the severity risk level to each vulnerability report. The severity risk level is an integer between 1 and 5, 1 being defined as the lowest risk level and 5 being defined as the highest risk level. Each data stream (e.g., the first data stream 100a, the second data stream 100b, the third data stream 100c, the n'th data stream 100d in FIG. 1) is being normalized and assigned a severity risk level and is sent by the first server as normalized data streams (i.e., first normalized data stream 140a, second normalized data stream 140b, third normalized data stream 140c, n'th normalized data stream 140d, etc. in FIG. 1). In certain implementations, the set of rules may include the severity of risk, the affected product, an available patch information, etc. or a combination thereof (shown as block 420a). Using the severity risk level enables the server to map (i.e., sort) the first data streams to standardized risk level. In some implementations, a vendor may use its own risk levels. In these instances, the normalizer uses a simple mapping between a vendor's risk levels and normalizer's severity risk levels. This can occur when the vendor is an especially structured vendor such as vendor advisory. In some embodiments, when the data stream is received from unstructured sources, such as blogs, a neural-net-based model is trained with textual descriptions of a large set of vulnerabilities tagged with their respective risk levels. In some embodiments, some data include large quantities of text. Some portions of the textual content may be irrelevant or unimportant to process. Therefore, in some embodiments, the normalizer summarizes large quantities of text from the data received from the first data streams into more manageable content. This is done using a Natural Language Program (NLP) technique (e.g., frequency summarizing). In some implementations, the normalizer may fill the missing information that crawlers could not determine (e.g. published and last modified dates associated with the vulnerability reports). The use of machine-learning algorithms to frequency summarizing and converting to canonical format is shown in block 420b. In some embodiments, where there are different languages, syntax and protocols in data streams, the normalizer converts the data streams received from the first data sources (i.e., the raw source materials) into a canonical form. The normalizer further strips unnecessary content and converts the data forms to standard unicode forms (block 420c).

In certain implementations, the normalizer aggregates all pertinent information received from the first data streams using two method; (a) Static method: consistently reporting vulnerabilities for a particular platform, operating system, hardware, or component (e.g., Microsoft RSS feed reporting only Microsoft vulnerabilities). In some embodiments, the type of the asset may be specified by the user. In some embodiments, the type of the asset may be derived from an asset database or may be inferred based upon the metadata of the asset. And (b) Dynamic method: which includes using a Named Entity Extractor (NER). The NER relies on a fairly large set of vendor and/or product keywords to determine the context of the data stream (e.g., a data received from a blog post) to determine its mapping with a set of asset types. In some embodiments, the normalizer adds the data received from the first data stream only to the pertinent data streams and not to the irrelevant streams. For example, when normalizer detects a vulnerability in a specific operating system, it does not add the information to the data streams that include other operating systems (as shown in block 420d).

In various implementations, the normalizer sorts the first set of data based on their respective risk level value (as shown in block 430). In various implementations, the correlator accesses the first set of data (as shown on block 440) and a second set of data streams from one or more second data sources (as shown in block 450). In various implementations, the second data streams include information about a hardware or a software or a system configuration obtained from different sources (as shown in block 450a). For example, the second data streams may be an inventory database, a CSV upload, a ReST API, a Powershell or a Unix Scripts, etc.

In various implementations, the correlator may correlate each of the normalized data streams (i.e., first normalized data stream 340a, second normalized data stream 340b, third normalized data stream 340c, n'th normalized data stream 340d, etc. in FIG. 3) with a data found on the second information streams (as shown in block 460). In various implementations, the second information streams include information about an asset (i.e., a hardware or a software or a system configuration) obtained from different sources. In various implementations, the second information streams include inventory of assets (i.e., asset profile) of an enterprise. The assets information may be provided by a user associated with the assets and is being updated either by the enterprise or by asset tracking or by a conventional fingerprinting method. For example, the asset profile of an enterprise includes information about its desktop computers, servers, laptops, mobile devices, software and operating systems in use, etc.

In some situations, when the detected vulnerability report does not contain the product name and version and its vendor, the correlator uses an NLP to extract possible missing information from the data streams or an NER to extract the missing data regarding the asset (as shown in block 460a). In various implementations, the correlator, upon detecting a vulnerability in a broad class of assets, further parse the asset inventory to refine the search within the assets to find the exact assets classes that are affected. The correlator's metrics to perform its tasks may include, but not limited to: vulnerability product list, asset metadata, source believability, exposure of the assets, etc. (as shown in block 460b). The asset information may include asset product list, platform or operating system that the assets are working on, or any other metadata about those assets. In various implementations, source believability may be determined based on historical data of the first data source and/or the frequency of the reported vulnerability. Therefore, when a data source has historically reported reliable vulnerability reports, the data source is more believable than a weblog, which the in the past, has reported a false vulnerability about a competitor's product to promote their product and harm a competitor. Moreover, a vulnerability report that has reported frequently different data sources is more believable compared to a vulnerability report that has reported only by a few data sources.

In various implementations, the system for impact-detection of vulnerability performs in a continuous, near real-time fashion to monitor the reported vulnerabilities. This continuous monitoring makes the system for impact-detection of vulnerability adaptable, since the user does not need to wait for the vulnerability to be established. The system for impact-detecting of vulnerability may further use abstraction of assets and deduplication of assets to enhance performance (as shown in block 460c). In the abstraction of assets technique, in order to closely attend to the relevant information of the assets (i.e., name of the vendor, product name, product version, product part number), other details or attributes of assets or systems (physical, spatial or temporal) are removed. Furthermore, different types of the entity's assets (e.g., desktop computers, mobile devices, etc.) share common identifiers. Hence, the system for impact-detection of vulnerability creates a symbolic asset for each class of assets to deduplicate the physical assets. For example, when there are thousand desktop computers with the same processors and operating systems, the system of the present application uses one of the desktop computers and creates a symbolic asset based on that desktop computer. This deduplication of physical assets expedites performance of the system for impact-detection of vulnerability. As another example, where there are a million IoT dwellers with identical stack, the system of the present application may use a representative dweller as the symbolic asset and maps it to actual devices. In various implementations, the method 40 includes calculating a confidence score for each data (as shown in block 470). In certain implementations, one or more normalized data streams may contain more than one vulnerability report. In such cases, the output from the correlator may contain more than one confidence score for each output data stream.

Figure 5:
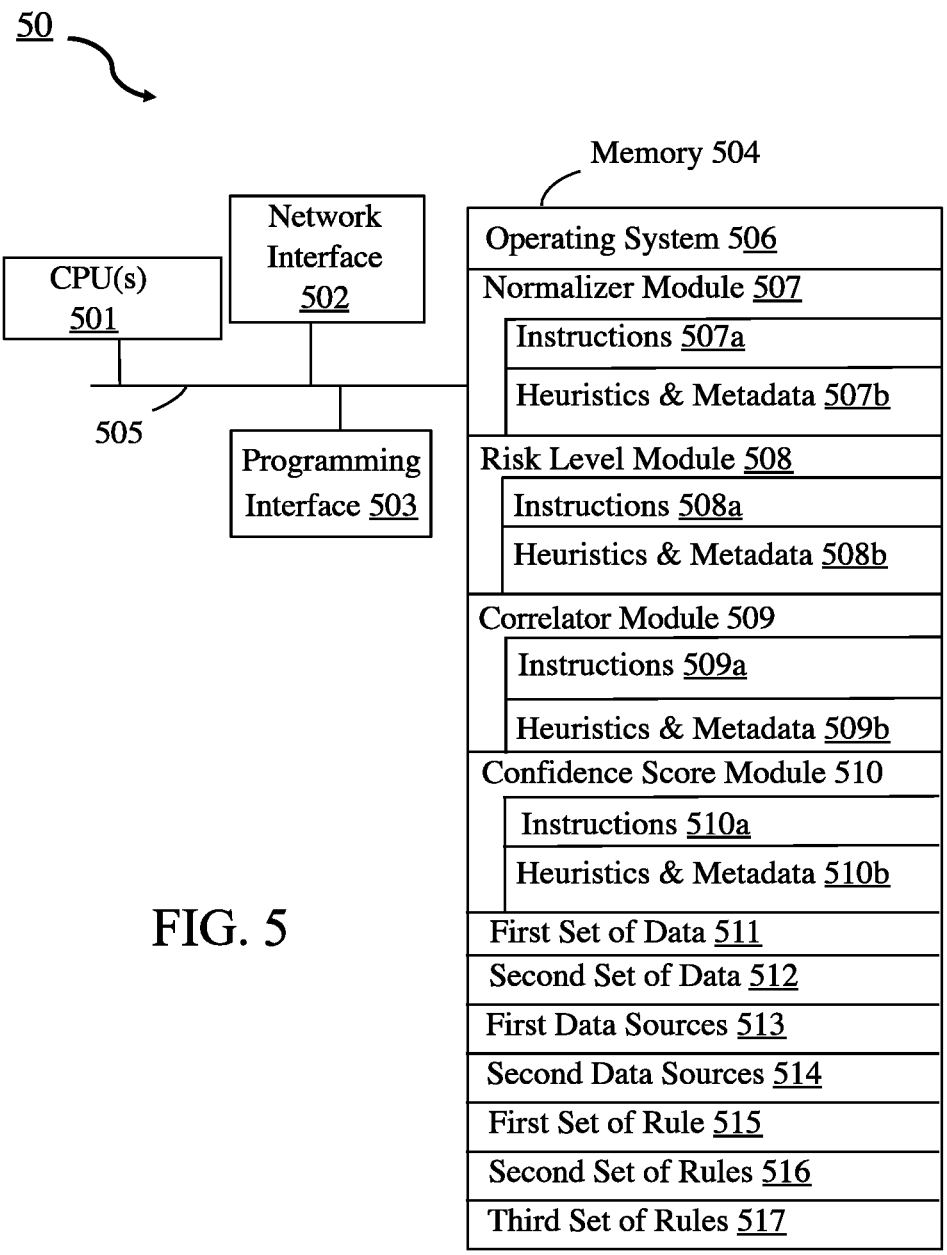
FIG. 5 is a block diagram of a server system enabled with various modules that are provided to detect impact of vulnerability by using a normalizer and correlator in accordance with some implementations.

FIG. 5 is a block diagram of a system 50 enabled with a vulnerability detection crawler bank in accordance with some implementations. In other words, in some implementations, the system 50 implements vulnerability detection using a crawler bank. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the communication buses 505 include circuitry that interconnects and controls communications between system components. The memory 504 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid-state storage devices. The memory 504 optionally includes one or more storage devices remotely located from the CPU(s) 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, a normalizer module 507, a risk level module 508, a correlator module 509, and a confidence score module 510. In various implementations, the normalizer module 507, the risk level module 508, the correlator module 509 and the confidence score module 510 perform substantially the same operations as the normalizer 120, the Risk level function 130, the correlator 170 and the confidence score function 180, respectively, shown in FIG. 1. To that end, in various implementations, the memory 504 includes instructions and/or logic 507a, 508a, 509a, and 510a and heuristics and metadata 507b, 508b, 509b and 510b that are associated with the normalizer module 507, the risk level module 508, the correlator module 509, the confidence score module 510, the first set of data 511, the second set of data 512, the first data streams 513, the second data streams 514, the first set of rules 515, the second set of rules 516 and the third set of rules 517. The operating system 506 includes procedures for handling various basic system services and for performing hardware dependent tasks.

In various implementations, the normalizer module 507 accesses a first data set 511 via a first data sources 511 (e.g., the first data streams 100 shown in FIG. 1). In some embodiments, the normalizer module 507 and a risk level function 508 associated with the normalizer module 507 calculates a risk level for each of the first data streams 511 based on a first set of rules 515. In some implementations, the correlator module 509 accesses normalized data streams (i.e., first normalized data stream 140a, second normalized data stream 140b, third normalized data stream 140c, n'th normalized data stream 140d, etc. in FIG. 1). The correlator module 509 may further access the second set of data 511 via a second data sources 513 and correlates each of the first set of data 511 to one or more of the second set of data 512, based on a second set of rules 516. The correlator module 509, through a confidence score module 510 associated with the correlator module 509, calculates a confidence score for each of the first set of data 511 and its respective second data 514 based on a third set of rules 517. While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a server including one or more processors and a non-transitory memory:
   accessing, by a normalizer, a first set of data, the first set of data being provided by one or more first data sources;
   using a risk level function associated with each of the one or more first data sources, calculating, by the normalizer, a risk level value for each of the first set of data based on a first set of rules, each risk level value being calculated based on one or more criteria, wherein the risk level value is an integer between 1 and 5;
   sorting, by the normalizer, the first set of data based on their respective risk level value;
   accessing, by a correlator, the sorted first set of data;
   accessing, by the correlator, a second set of data, the second set of data being provided by one or more second data sources;
   correlating each of the sorted first set of data to at least a data of the second set of data based on one or more of a second set of rules; and
   calculating, by the correlator, a confidence score for each data of the sorted first set of data based on one or more rule of a third set of rules.

2. The method of claim 1, wherein the first set of data is a reporting of a bug or an error in a hardware or in a software or in a system configuration of a provider or a reporting of a malware or a ransomware or a virus in a software of a provider.

3. The method of claim 1, further comprising:
   when the calculated confidence score of a data of the first set of data is above a predetermined threshold, notifying a user associated with the data.

4. The method of claim 1, further comprising:
   when the calculated confidence score of a data of the first set of data is above a predetermined threshold, providing a user associated with the data with a patch or a ticketing tool.

5. The method of claim 1, wherein the second set of data is data about a hardware or a software.

6. The method of claim 1, wherein the first set of rules is a severity of risk, an affected product, or a patch information.

7. The method of claim 1, wherein the one or more second data source is an inventory database, a CSV upload, a ReST API, a Powershell or a Unix Scripts.

8. The method of claim 1, wherein the one or more second data source is provided by a user associated with the respective second data.

9. The method of claim 1, wherein the one or more second data source is being updated at predetermined time intervals.

10. The method of claim 1, wherein the one or more of a first set of rules is a same product name, a same product manufacturer, a same product vendor, a same product version or a same product part number.

11. The method of claim 1, wherein the one or more of the second set of rules is a first data source historical data.

12. The method of claim 1, further comprising:
- identifying, by the correlator, one or more data of the second set of data correlated to same data of the second set of data; and
- calculating, by the correlator, a confidence score for one data of the second set of data based on one or more rule of a second set of rules, the calculated confidence score being used for all identified data.

* * * * *